H. C. FORD.
DEMOUNTABLE RIM LOCKING DEVICE.
APPLICATION FILED MAR. 15, 1911.
1,086,760.
Patented Feb. 10, 1914.
2 SHEETS—SHEET 1.
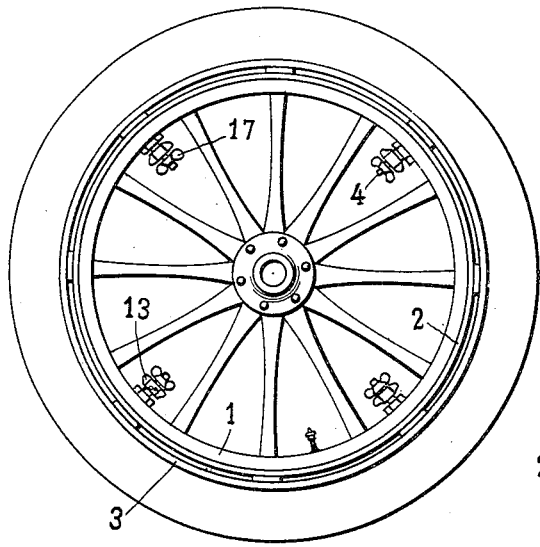
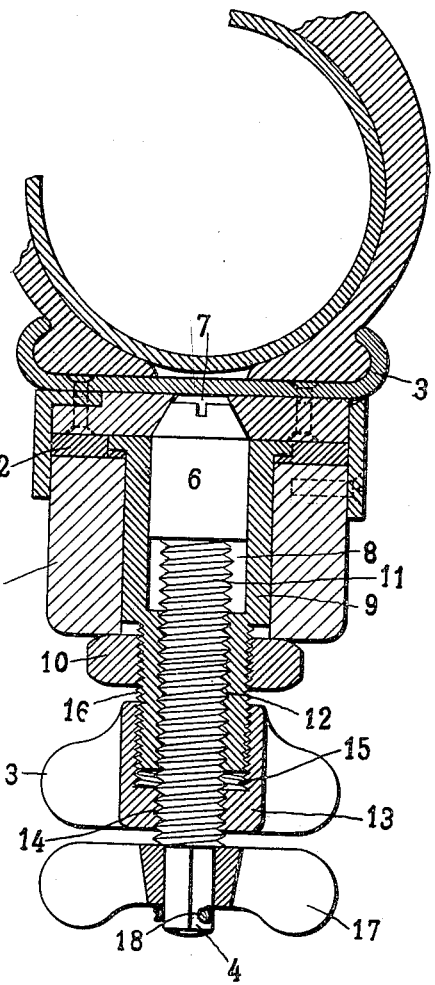
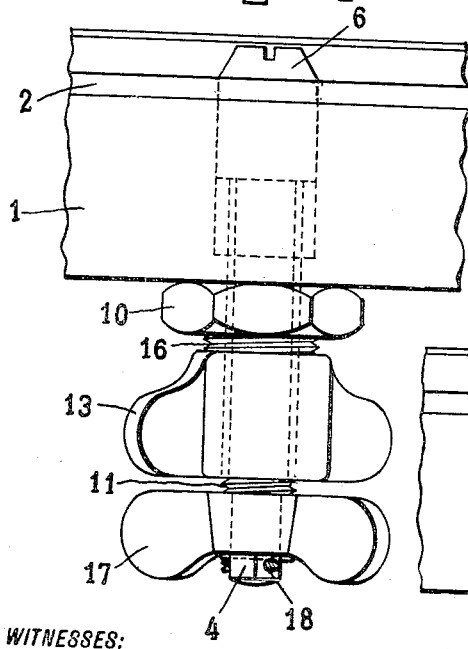
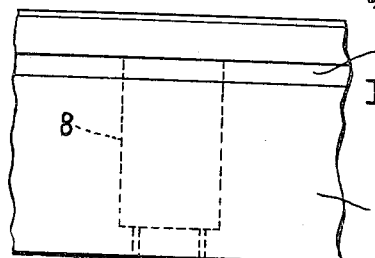
WITNESSES:
INVENTOR
Hannibal C. Ford.
BY
ATTORNEY H. C. FORD.
DEMOUNTABLE RIM LOCKING DEVICE.
APPLICATION FILED MAR. 15, 1911.
1,086,760.
Patented Feb. 10, 1914.
2 SHEETS—SHEET 2.
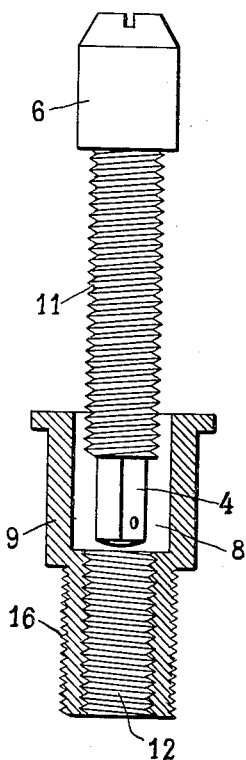
Fig. 5.
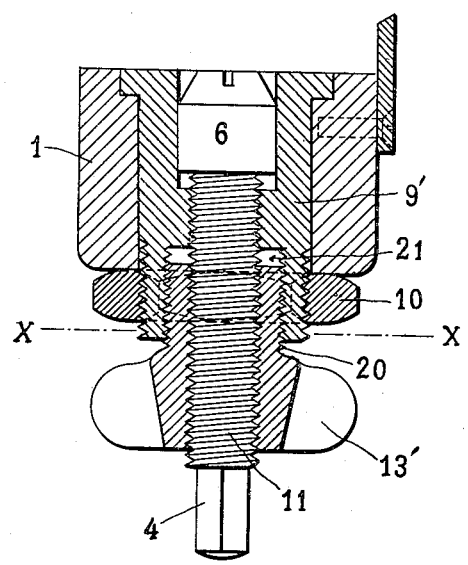
Fig. 6.
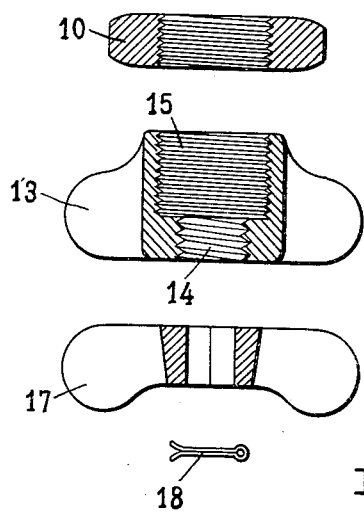
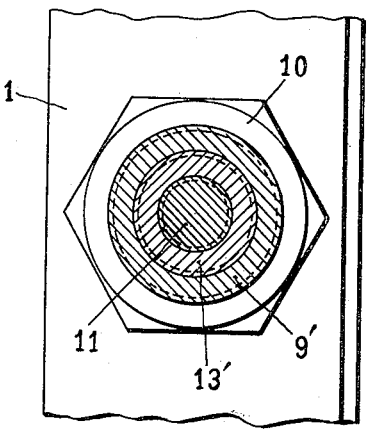
Fig. 7.
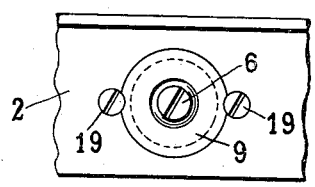
Fig. 8.
WITNESSES:
J. Clyde Ripley
E. Bradford
INVENTOR
Hannibal C. Ford.
ATTORNEY

UNITED STATES PATENT OFFICE.

HANNIBAL C. FORD, OF JAMAICA, NEW YORK, ASSIGNOR TO EDWARD W. HILL, OF NEW YORK, N. Y.

DEMOUNTABLE-RIM-LOCKING DEVICE.

1,086,760.

Specification of Letters Patent.    Patented Feb. 10, 1914.

Application filed March 15, 1911. Serial No. 614,577.

*To all whom it may concern:*

Be it known that I, HANNIBAL C. FORD, a citizen of the United States, and resident of Jamaica, in the county of Queens and State of New York, have invented certain new and useful Improvements in Demountable-Rim-Locking Devices, of which the following is a specification.

My invention relates particularly to locking devices for demountable rims for pneumatic tires. The form of tires however, is immaterial.

One object of the invention is to provide a construction in which the rim when in place is locked securely and cannot become accidentally detached.

Another object is to prevent the working loose and loss of the parts of the locking device or devices.

My invention contemplates the use of one or more radially operable locking bolts with a locking nut for each bolt, the nuts being so mounted in connection with sleeves in the felly that it is impossible for either the bolts or nuts to work out or off when the tire rim is in place. Even when the tire rim is demounted and the locking bolts removed the lock nuts are still connected to the felly.

The accompanying two sheets of drawings illustrate two forms of the invention.

Figure 1, is a side elevation of a wheel with locking devices embodying the improvements of my invention. Fig. 2, is a transverse sectional view of the tire and felly and a locking device of my invention. Fig. 3, is a side view of a fragment of the felly with the locking device of my invention, the locking bolt projecting. Fig. 4, is a similar view, the bolt being entirely withdrawn and the set nut for the sleeve being shown in section. Fig. 5, is a view showing the separate parts of the locking device, the bolt being in side elevation and other parts in section. Fig. 6, is a transverse section of a modification. Fig. 7, is a section of the same on the plane of the line X X Fig. 6. Fig. 8, is a view of a fragment of the felly showing means for preventing rotation of the sleeve.

The wheel in the form shown has the wooden part or felly 1 and metal felly band 2 which is employed for greater strength and durability. Any form of tire and of tire rim such as 3 may be employed. The tire rim is locked in place on the felly by means of one or more locking bolts such as 4. For greater strength I prefer to have a series of plates such as 5 secured to the tire rim and corresponding to the number and location of the locking bolts. Each locking bolt has a head 6, the end of which is conical and slotted for engagement with a screw driver and adapted to seat in a conical recess 7 in one of the tire rim plates 5. The head of the bolt is radially movable in a recess 8 which is preferably formed in a sleeve 9 mounted in the felly. This sleeve 9 may be secured in place in any suitable manner as for instance, by means of a nut 10. In the construction shown the sleeve is shouldered or flanged on its outer end and the nut 10 on the inner end of the sleeve by acting against the inner side of the felly serves to securely clamp the sleeve in place. The bolt 4 is threaded as at 11 to fit the threads of a tapped hole 12 in the sleeve 9. When therefore the bolt 4 is rotated by suitable means it moves radially in the sleeve 9 and the head 6 moves out or in depending upon the direction of rotation of the bolt 4. When the heads of the locking bolts are forced into the conical recesses in the tire rim or the tire rim plates, the tire rim is drawn into place and held securely in position both circumferentially and laterally. As such wheels are subjected to very considerable and repeated vibrations there is danger of the locking bolts working loose from their engagement with the tire rim and to prevent this I employ on each locking bolt a lock nut 13 which has an interior thread 14 fitting on the thread 11 of the locking bolt. This locking nut also has an interior thread 15 which engages with the threads 16 on the sleeve 9. The pitch of the threads 16 on the sleeve 9 and the threads 11 on the bolt 4 is not the same but one of the threads has a slightly greater pitch than the other for instance, sixteen and twelve to the inch respectively. The result is that when the locking nut 13 is rotated it advances at a different rate on the sleeve threads 16 than it does along the bolt threads 11. By reason of the differential action of the two threads the lock nut is therefore gradually wedged tightly between the threads 11 of the bolt 4 and the threads 16 of the sleeve 9 so that the bolt 11 cannot be turned or work loose. When the lock nut 13 is turned backward slightly it releases the pressure on the threads 11 of the locking bolt 4 so that the locking bolt may be rotated to retract its head 6 from the recess 7 of the rim plate 5 and permit the tire rim to be removed. A wing nut 17 may be secured on the end of the bolt 4 to facilitate turning the bolt. A cotter pin 18 may be used to hold the nut 17 on. When the tire rim is off (and the nut 17 if used) the locking bolt may be taken out by screwing it outwardly. It is shown partially removed in Fig. 3 and the bolt entirely removed from Fig. 4.

A screw or screws 19, 19 may be used to prevent the sleeve 9 from rotating in the felly.

It will be noted from the foregoing description and illustration that even when the locking bolt has been removed as in Fig. 4 that the lock nut 13 is still on the sleeve 9. There is therefore no danger of the locking nut being dropped or lost. The lock nut can be removed by simply rotating so as to release the threads 15 from the threads 16. When the parts are assembled as in Fig. 2 the locking bolt cannot be entirely withdrawn inwardly from the felly because the head 6 is larger than the threaded shank 11. It is also impossible when the locking bolt is in place to take off the lock nut because of the differential thread action. The nut 13 has only a limited rotative movement when the parts are assembled,—say one-half a turn.

To assemble the parts, the locking nut 13 is first screwed on to the sleeve 9 as shown in Fig. 4. The bolt 4 is then screwed down through the threaded part 12 of the sleeve 9 and through the threaded part 14 in the nut 13. The parts may be locked by simply turning the nut 13 to take up the backlash in the threads. The amount of rotation necessary to give the locking nut 13 in order to lock the bolt 4 will depend upon the difference in pitch of the threads 11 and 16 and the amount of play in the threads of the bolt, lock nut and sleeve. The advantages of this construction as above pointed out will be apparent.

In Figs. 6 and 7 I have shown a modification. The bolt 4 has the same threads 11 as before and screws into the sleeve 9'. The nut 13' screws onto the bolt threads 11 and has an exterior thread 20 of different pitch which screws into the threads 21 in a recess in the sleeve 9' so as to secure the differential action. The similarity of construction and action will be seen by comparing Figs. 2 and 6. In the former case the nut 13 screws onto the sleeve 9 and in the latter case the nut 13' screws into the sleeve 9'.

Both forms of construction can be locked by turning the lock nut 13 in either direction but the lock is most effective if the nut is turned in the same direction as the bolt was turned in tightening the bolt.

What I claim is:—

1. In a demountable tire rim construction, the combination of a felly provided with a threaded socket, a threaded locking bolt seated in the threaded socket and movable radially inward and outward by being turned in the socket, and a lock nut engaged on the inner end of the said bolt, having connection with the felly to thereby lock the bolt in place, the said lock nut being rotatably attached to the felly so that it may be turned for the purpose of securing the locking bolt and positively carried by the said felly whereby upon removal of the locking bolt the lock nut will remain attached to the felly.

2. In a demountable tire rim construction, the combination with a felly, of a two-threaded sleeve non-rotatably secured in the felly, a threaded locking bolt engaging one set of threads in the sleeve and movable rotatively in the sleeve to carry said bolt radially inward and outward, and a two-threaded lock nut engaging the threaded locking bolt with one set of threads and engaging with its other set of threads the other set of threads on the fixed sleeve and thereby indirectly attached to and supported by the felly, the two sets of engaging threads on the sleeve and nut respectively being of different pitch whereby rotation of the nut on the sleeve may by reason of the wedging of the nut between the threads of the bolt and sleeve serve to lock the bolt in the position to which it is adjusted in the sleeve and said lock nut is prevented from being removed from said sleeve while said bolt is in said nut.

3. In a demountable tire rim construction, the combination of a felly, a tire rim on the felly, a sleeve seated in the felly and shouldered at its outer end to provide a stop, said sleeve having external screw threads on its inner end and internal screw threads of a different pitch from the external screw threads, a securing nut on the external screw threads at the inner end of the sleeve engaging the inner side of the felly to clamp the sleeve fixedly in place on the felly, a locking bolt threaded to correspond to the internal screw threads of the sleeve seated in the sleeve and rotatable therein so as to be moved radially into and out of engagement with the tire rim, and a lock nut having one set of screw threads corresponding to and engaged on the threads of the locking bolt and a second set of screw threads corresponding to and engaged on the external screw threads on the fixed sleeve, whereby rotation of the lock nut on the sleeve will wedge the nut between the threads of the bolt and sleeve to thereby lock the bolt in the sleeve.

HANNIBAL C. FORD.

Witnesses:
R. S. ALLYN,
EDWARD W. HILL.